(12) United States Patent
Bardelski et al.

(10) Patent No.: US 10,491,392 B2
(45) Date of Patent: Nov. 26, 2019

(54) END-TO-END VEHICLE SECURE ECU UNLOCK IN A SEMI-OFFLINE ENVIRONMENT

(71) Applicant: Ford Global Technologies, LLC, Dearborn, MI (US)

(72) Inventors: David Bardelski, Dearborn, MI (US); Kevin Thomas Hille, Plymouth, MI (US); Aldi Caushi, Northville, MI (US); Xin Ye, Westkand, MI (US); Mohamad Yassine, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 15/446,918

(22) Filed: Mar. 1, 2017

(65) Prior Publication Data
US 2018/0254903 A1 Sep. 6, 2018

(51) Int. Cl.
*H04L 9/32* (2006.01)
*B60R 16/023* (2006.01)
(Continued)

(52) U.S. Cl.
CPC ........ *H04L 9/3226* (2013.01); *B60R 16/0232* (2013.01); *G06F 21/44* (2013.01); *G06F 21/72* (2013.01); *H04L 9/0869* (2013.01); *H04L 9/0891* (2013.01); *H04L 9/0894* (2013.01); *H04L 9/3228* (2013.01); *G07C 5/0808* (2013.01); *G07C 2205/02* (2013.01);
(Continued)

(58) Field of Classification Search
USPC ........ 713/171, 150, 163, 181; 726/2, 21, 36; 380/255, 264, 276
See application file for complete search history.

(56) References Cited

U.S. PATENT DOCUMENTS

| 2 A * | 7/1836 | Goulding | C02F 1/00 |
| | | | 57/58.49 |
| 9,020,147 B2 * | 4/2015 | Kawamura | H04L 9/0816 |
| | | | 380/44 |

(Continued)

FOREIGN PATENT DOCUMENTS

| CN | 202141943 U | 2/2012 |
| WO | WO 2016075865 A1 | 5/2016 |

OTHER PUBLICATIONS

John Day, dSPACE Offline Simulator aids virtual ECU testing, Dec. 16, 2011 (pp. 4).
(Continued)

*Primary Examiner* — Sharif E Ullah
(74) *Attorney, Agent, or Firm* — Frank Lollo; Eversheds Sutherland (US) LLP (57) ABSTRACT

Method and apparatus are disclosed for end-to-end vehicle secure ECU unlock in a semi-offline environment. An example vehicle electronic control unit includes a first processor and a second processor. The first processor, when unlocked, provides diagnostic information. The second processor sends a seed value to a diagnostic tool. Additionally, the second processor, in response to receiving a second key, unlocks the first processor. The second processor, after receiving a first verifier, decrypts the first verifier to generate a new key, replaces a current key with the new key, and sends a second verifier to the diagnostic tool.

15 Claims, 4 Drawing Sheets

(51) Int. Cl.
*G06F 21/72* (2013.01)
*H04L 9/08* (2006.01)
*G06F 21/44* (2013.01)
*G07C 5/08* (2006.01)
*H04W 12/04* (2009.01)

(52) U.S. Cl.
CPC ...... *H04L 2209/80* (2013.01); *H04L 2209/84* (2013.01); *H04W 12/04* (2013.01)

(56) References Cited

U.S. PATENT DOCUMENTS

| | | | |
|---|---|---|---|
| 9,094,382 B2 | 7/2015 | Kawamura et al. | |
| 9,137,658 B2 | 9/2015 | Kawamura et al. | |
| 9,330,510 B2 | 5/2016 | Kawamura et al. | |
| 9,477,843 B2* | 10/2016 | Nairn | G06F 21/6218 |
| 9,509,496 B2* | 11/2016 | Kawamura | B60R 25/24 |
| 9,509,499 B2* | 11/2016 | Kawamura | H04L 9/0866 |
| 9,714,004 B2* | 7/2017 | Kawamura | B60R 25/24 |
| 9,843,597 B2* | 12/2017 | Allouche | H04L 63/1416 |
| 9,854,442 B2* | 12/2017 | Mazzara, Jr. | H04W 12/08 |
| 9,894,629 B2* | 2/2018 | Park | H04W 60/00 |
| 10,009,325 B1* | 6/2018 | David | H04L 12/40 |
| 10,052,964 B2* | 8/2018 | Park | B60L 11/1859 |
| 10,057,286 B2* | 8/2018 | Ben David | G06F 21/55 |
| 10,095,859 B2* | 10/2018 | Miyake | G06F 21/445 |
| 10,166,993 B2* | 1/2019 | Boran | B60W 50/0098 |
| 2007/0028115 A1* | 2/2007 | Kober | G06F 21/572 |
| | | | 713/180 |
| 2007/0293999 A1* | 12/2007 | Underdal | G06N 5/022 |
| | | | 701/32.8 |
| 2013/0111582 A1* | 5/2013 | Forest | G06F 21/44 |
| | | | 726/19 |
| 2013/0301834 A1* | 11/2013 | Kawamura | H04W 12/04 |
| | | | 380/270 |
| 2014/0098958 A1* | 4/2014 | Kawamura | B60R 25/24 |
| | | | 380/277 |
| 2014/0232521 A1* | 8/2014 | Kawamura | G07C 9/00896 |
| | | | 340/5.26 |
| 2014/0317729 A1* | 10/2014 | Naitou | H04L 63/0428 |
| | | | 726/21 |
| 2016/0035147 A1* | 2/2016 | Huang | H04L 9/0869 |
| | | | 701/31.4 |
| 2016/0099806 A1* | 4/2016 | Racklyeft | H04L 9/0866 |
| | | | 380/281 |
| 2016/0173505 A1* | 6/2016 | Ichihara | H04L 63/123 |
| | | | 713/170 |
| 2016/0315766 A1* | 10/2016 | Ujiie | H04L 63/0428 |
| 2016/0344704 A1* | 11/2016 | Stumpf | H04L 63/12 |
| 2016/0344705 A1* | 11/2016 | Stumpf | H04W 4/44 |
| 2018/0063098 A1* | 3/2018 | Robins | H04L 63/0471 |

OTHER PUBLICATIONS

Search Report dated Aug. 16, 2018 for GB Patent Application No. GB 1803059.3 (3 pages).
A J Menezes, P C van Oorschot, S A Vanstone, "*Handbook of Applied Cryptography*", published 1996, CRC Press, See in particular sections 10.3 and 12.3.

* cited by examiner

END-TO-END VEHICLE SECURE ECU UNLOCK IN A SEMI-OFFLINE ENVIRONMENT

TECHNICAL FIELD

The present disclosure generally relates to diagnostic tools for electronic control units (ECUs) of a vehicle and, more specifically, end-to-end vehicle secure ECU unlock in a semi-offline environment.

BACKGROUND

Modern vehicles contain electronic control units (ECUs) that are capable of performing on-board diagnostic (OBD) processes. Vehicles include connectors, such as OBD-II connectors, that allow external diagnostic tools to be coupled to the vehicle data buses to interact with ECUs. A diagnostic tool may query a vehicle for OBD test results as well as for real-time data. Moreover, a diagnostic tool may direct an ECU to perform some action. For example, a vehicle repair facility may connect to the OBD-II port to obtain information to determine why a check-engine light is illuminated. Some ECUs, such as the powertrain control module, perform critical functions. As such, those ECUs are secured to prevent accessing the diagnostic capability without authorization.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for end-to-end vehicle secure ECU unlock in a semi-offline environment. An example vehicle electronic control unit includes a first processor and a second processor. The first processor, when unlocked, provides diagnostic information. The second processor sends a seed value to a diagnostic tool based on a first key. Additionally, the second processor, in response to receiving a second key, unlocks the first processor. The second processor, after receiving a first verifier, decrypts the first verifier to generate a third key, replaces the first key with the third key, and sends a second verifier to the diagnostic tool.

A secure processor sends a random seed to a diagnostic tool. In response to receiving an unlock key, the secure processor unlocks a diagnostic processor. The diagnostic processor exchanges the diagnostic information with the diagnostic tool. After receiving a first verifier, the secure processor decrypts the first verifier to generate an new offline key. The secure processor replaces an initial offline key with the new offline key. Additionally, the secure processor sends second verifier to the diagnostic tool.

An example system includes a remote ECU security manager (ESM), a diagnostic tool, and a vehicle electronic control unit. The remote security manager provides a first offline key, a first verifier, and a second verifier to a diagnostic tool, and, in response to receiving a completion notification from the diagnostic tool, replaces the first offline key stored in memory with a second offline key. The diagnostic tool generates an unlock key based on the first offline key and a random seed value from a vehicle electronic control unit. In response to receiving a success notification, the diagnostic tool exchanges diagnostic information with the vehicle electronic control unit and sends the first verifier to the vehicle electronic control unit. The vehicle electronic control unit sends the seed value to the diagnostic tool, unlocks a diagnostic mode in response to the unlock key from the diagnostic tool being valid, generates the second offline key based on the first verifier, and replaces the first offline key with the second offline key.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

End-to-end secure electronic control units (ECUs) utilize different levels of security protection when the vehicle is serviced. As used herein, an "end-to-end secure ECU" refers to an ECU with diagnostic routines that are only accessible after authentication and authorization from a remote (e.g., accessible via a network connection) server operated by an ECU security manager (ESM) (e.g., an ECU manufacture, a vehicle manufacturer, a third party key holder, etc.). Traditionally, end-to-end security requires online communication (e.g., via an Ethernet, a wireless local area network, a cellular and/or a satellite connection, etc.) between the end-to-end secure ECU and the ESM. Such end-to-end secure ECUs include a generated seed value, an unlock key, and a security key. When a diagnostic tool is connected to an on-board diagnostic port (e.g., the OBD-II port, etc.) of the vehicle, the end-to-end secure ECU provides the seed value to the ESM via the network connection. The ESM also includes the security key. The ESM uses the seed value and the security key to generate a candidate unlock key. The ESM sends the candidate unlock key to the ECU via the network connection. When the candidate unlock key matches the unlock key of the end-to-end secure ECU, the end-to-end secure ECU unlocks and allows the diagnostic tool to access the diagnostic processes of the ECU.

However, in some scenarios, the diagnostic tool cannot maintain a continuous connection to a network. As used herein, "online" refers to the diagnostic tool being connected to the ESM via a network connection. Additionally, "offline" refers to the diagnostic tool not being connected to the ESM via a network connection. "Semi-offline" refers to the diagnostic tool having intermittent access to the ESM via a network connection. For example, initially, a vehicle may be brought into a repair garage to be diagnosed where a network connection is available. In such an example, to diagnose the vehicle, a technician may perform a road test and exit the repair garage where the network connection is not available. In such an example, the technician may, via the diagnostic tool, need to access the diagnostic processes of the ECU while the diagnostic tool is not connected to the network.

As disclosed below, the end-to-end security system provides a method to access the diagnostic processes of an end-to-end secure ECU when the diagnostic tool is semi-offline. The end-to-end secure ECU and the ESM share a security key (SKEY), an offline key (OKEY), and a counter value. Initially, the diagnostic tool requests the offline key (OKEY) from the ESM while the diagnostic tool is online. The ESM has a current offline key (OKEY) in memory, and OKEY is unique to the ECU instance and the vehicle instance under test. In response to receiving a request from the diagnostic tool, the ESM generates a new offline key (OKEY) and at least two verifiers (V1 and V2). The verifiers (V1 and V2) are based on the shared security key (SKEY), the counter value, and/or the key offline key (OKEY). The ESM provides the current offline key (OKEY) and the verifiers (V1 and V2) to the diagnostic tool.

When offline, the diagnostic tool requests access to the end-to-end secure ECU. The end-to-end secure ECU provides a seed value to the diagnostic tool. Using the seed value and the current offline key (OKEY), the diagnostic tool generates a candidate unlock key (UKEY) and sends it to the end-to-end secure ECU. The end-to-end secure ECU generated the unlock key (UKEY) based on the seed value sent to the diagnostic tool and the current offline key (OKEY) stored in secure memory. In response to the candidate unlock key (UKEY) matching the unlock key (UKEY) generated by the end-to-end secure ECU, the end-to-end secure ECU unlocks access to its diagnostic functions and notifies the diagnostic tool. The end-to-end secure ECU and diagnostic tool then can exchange diagnostic information. When the diagnostic is complete, the diagnostic tool sends a first verifier (V1) to the end-to-end secure ECU. The end-to-end secure ECU then generates (a) a new offline key based on the first verifier (V1) using the shared security key (SKEY), and (b) a candidate verifier (V2_C) based on the new offline key (OKEY) and the shared counter value. The end-to-end secure ECU sends the candidate verifier (V2_C) to the diagnostic tool. When the diagnostic tool is online, in response to the candidate verifier (V2_C) matching the second verifier (V2) from the ESM, the diagnostic tool notifies the ESM. The ESM then sets the new offline key (OKEY) to be the current offline key (OKEY).

In such a manner, a malicious third party is unable to access the diagnostic functions of the end-to-end secure ECU without knowing the offline key (OKEY). Additionally, because the offline key (OKEY) changes after every diagnostic session, the malicious third party is unable to update the offline key (OKEY) without knowing the security key (SKEY). As a result, even if the malicious third party is able to intercept the current offline key (OKEY), they can only access the diagnostic processes once.

Figure 1:
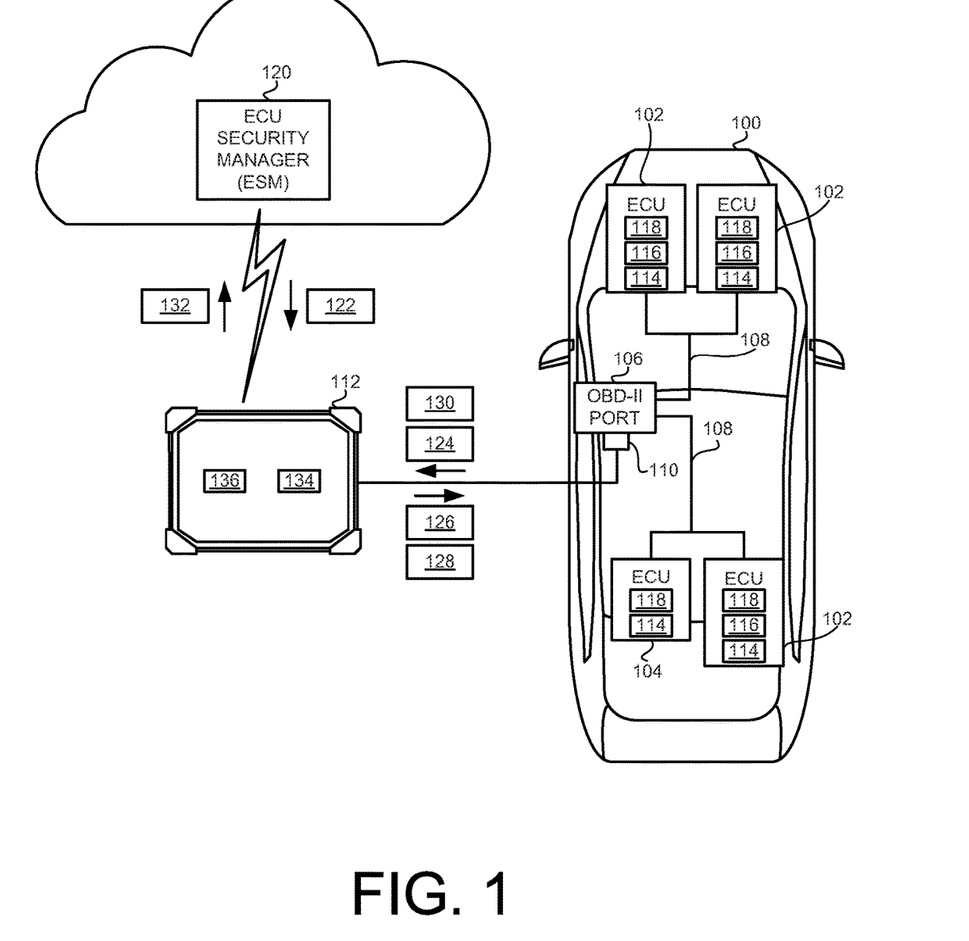
FIG. 1 illustrates a vehicle with secured electronic control units in accordance with the teachings of this disclosure.

FIG. 1 illustrates a vehicle 100 with secured electronic control units (ECUs) 102 and 104 in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle includes an on-board diagnostic port 106 (e.g., an OBD-II port, etc.) communicably connected to the secure ECUs 102 and 104 via vehicle data buses 108.

The on-board diagnostic port 106 is a connector configured to receive a mating connector 110 communicatively coupled to a diagnostic tool 112. In some examples, the on-board diagnostic port 106 is implemented in accordance with the On-Board Diagnostic II (OBD-II) specification (e.g., SAE J1962 and SAE J1850) maintained by the Society of Automotive Engineers (SAE). In some examples, the on-board diagnostic port 106 is under or near an instrument panel cluster of the vehicle 100. In some examples, the OBD-II port is a wireless radio serving to wirelessly connect the vehicle 100 with the diagnostic tool 112.

The ECUs 102 and 104 monitor and control the subsystems of the vehicle 100. The ECUs 102 and 104 communicate and exchange information via the vehicle data buses 108. Additionally, the ECUs 102 and 104 communicate properties (such as status, sensor readings, control state, error and diagnostic codes, etc.) to and/or receive requests from other ECUs 102 and 104 and/or the diagnostic tool 112 via the mating connector 110 connected to the on-board diagnostic port 106. Some vehicles 100 may have seventy or more ECUs 102 and 104 located in various locations around the vehicle 100. The ECUs 102 and 104 are discrete sets of electronics that include their own circuit(s) (such as integrated circuits, microprocessors, memory, storage, etc.) and firmware, sensors, actuators, and/or mounting hardware. For example, the ECUs 102 and 104 may include a body control module, a powertrain control module, a brake control module, and/or a telematics control unit, etc.

The ECUs 102 and 104 have different modes of operation, such as a normal mode and a diagnostic mode. While the vehicle 100 is operating, the ECUs 102 and 104 are in the normal mode by default. While in the normal mode, the ECUs 102 and 104 perform functions for the operation of the vehicle 100, but sensitive functions are not accessible. In diagnostic mode, the ECUs 102 and 104 may, for example, (a) report status and sensor information, (b) be rebooted, (c) be reprogrammed, (d) be commanded by the diagnostic tool 112 to perform certain actions and/or (e) test connections to the related subsystems, etc. For example, a body control module may report the status of the headlights, be commanded by the diagnostic tool 112 to test the headlights (e.g., cause the headlights cycle in a specific pattern), and/or reset (which may cause the headlights to turn off while the body control module reboots.). The diagnostic tool 112 sends commands to the ECUs 102 and 104 to enter the diagnostic mode in order to test and/or diagnose the ECU(s) 102 and 104.

Some ECUs 102 and 104 are secured. When the ECU(s) 102 and 104 are secured, the ECU(s) 102 and 104 do not enter the diagnostic mode unless the diagnostic tool 112 is authorized. As disclosed below in FIGS. 2 and 3A, 3B, the diagnostic tool 112 is authorized when it provides a correct unlock key (UKEY) to the secured ECU(s) 102 and 104.

The ECUs 102 include an operations processor or controller 114, a secure processor or controller 116 (sometimes referred to as a "cryptoprocessor"), and memory 118. The operations processor or controller 114 controls the operation of the ECUs 102 and 104. The operations processor or controller 114 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). Additionally, the secure processor or controller 116 may be any suitable processing device or set of processing devices such as, but not limited to: a microprocessor, a microcontroller-based platform, an integrated circuit, one or more FPGAs, and/or one or more ASICs. The secure processor or controller 116 is a dedicated processor and/or circuit to perform cryptographic operations associated with determining whether a diagnostic tool 112 is authorized to access the diagnostic mode of the ECU 102. In some examples, the secure processor or controller 116 includes physical security measures to resist physical tampering. In some examples, the ECU(s) 104 does not include the secure processor or controller 116. In such examples, the cryptographic operations associated with determining whether a diagnostic tool 112 is authorized are performed by the operations processor or controller 114.

The memory 118 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 118 includes multiple kinds of memory, particularly volatile memory and non-volatile memory. In some examples, the memory 118 includes secure memory communicatively coupled to the secure processor or controller 116 via a secure data bus. The secure portion of the memory 118 includes an embedded hardware encryption engine with its own authentication keys to securely store information. The cryptographic algorithm of the hardware encryption engine encrypts (a) data stored in the secure portion of the memory 118 and (b) data sent between the secure portion of the memory 118 and the secure processor or controller 116.

The memory 118 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 118, the computer readable medium, and/or within the processors 114 and 116 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus(es) 108 communicatively couple(s) the ECUs 102 and 104 and the on-board diagnostic port 106. The vehicle data bus(es) 108 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

The diagnostic tool 112 communicates with the ECUs 102 and 104 via the mating connector 110 plugged into the on-board diagnostic port 106. In the illustrated example, the diagnostic tool 112 is connected to the mating connector 110 via a wired connection. Alternatively, in some examples, the mating connector 110 and the diagnostic tool 112 include wireless controllers (e.g., a wireless local area network controller, a Bluetooth® controller, a Bluetooth® Low Energy controller (BLE), etc.). In such examples, the mating connector 110 and the diagnostic tool 112 are communicatively coupled via a wireless connection.

The diagnostic tool 112 has an online mode and an offline mode. In the online mode, the diagnostic tool 112 is communicatively coupled to an ECU security manager (ESM) 120 located on an external network. The diagnostic tool 112 includes a wired or wireless interface to communicatively couple with the ESM 120. When in the online mode, the diagnostic tool 112 requests authentication data 122 for a particular vehicle 100 based on, for example, the vehicle identification number (VIN) of the vehicle 100 to be diagnosed. In some examples, the diagnostic tool 112 retrieves the VIN from the vehicle 100 to be diagnosed via the on-board diagnostic port 106. Alternatively, in some example, a technician enters the VIN via an input interface (e.g., a keypad, a touch screen, etc.) of the diagnostic tool 112. After receiving the authentication data 122, the diagnostic tool 112 can exchange authentication tokens 124 and 126 with the ECU 102 and 104 to be diagnosed while in the online or the offline mode without further communicating with the ESM 120.

To become authorized to diagnose the ECU(s) 102 and 104, the diagnostic tool 112 sends an access request to the ECU(s) 102 and 104 to be diagnosed. The ECU(s) 102 and 104 respond with seed values 124. Based on the authentication data 122 received from the ESM and the seed values 124, the diagnostic tool 112 generates a candidate unlock key (UKEY) 126. The diagnostic tool 112 sends the candidate unlock keys (UKEY) 126 to the ECU(s) 102 and 104. In response to the candidate unlock keys (UKEY) 126 being correct, the ECU(s) 102 and 104 unlock and accept commands to enter their diagnostic mode. After being authorized, the diagnostic tool 112 sends diagnostic commands 128 to the ECUs 102 and 104. For example, the diagnostic tool 112 may instruct one of the ECUs 102 and 104 to enter its diagnostic mode and perform a test routine. Additionally, the diagnostic tool 112 receives diagnostic data 130 from the ECUs 102 and 104. When the diagnostic is complete and the diagnostic tool 112 is in the online mode, the diagnostic tool 112 sends completion data 132 to the ESM 120.

In the illustrated example, the diagnostic tool 112 includes a processor 134 and memory 136. The processor 134 may be any suitable processing device or set of processing devices such as, but not limited to: a microprocessor, a microcontroller-based platform, a suitable integrated circuit, one or more FPGAs, and/or one or more ASICs. The memory 136 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 136 includes multiple kinds of memory, particularly volatile memory and non-volatile memory.

The ESM 120 stores security keys (SKEY) and counter values for the ECUs 102 and 104 in association with vehicle identifiers (such as VINs, etc.) and/or with ECU identifiers (such as a serial number, etc.). As disclosed below in FIGS. 2 and 3A, 3B, in response to receiving a request with a vehicle identifier from a diagnostic tool 112, the ESM 120 generates the authentication data 122 based on the security key (SKEY) and the counter value associated with the vehicle identifier. In some examples, to send the request, the diagnostic tool 112 first logs into the ESM 120 using separate credentials (e.g., a username and password, an exchange of authentication tokens, etc.). In response to receiving completion data 132, the ESM 120 changes the authentication data 122 that will be sent in response to another request for the particular vehicle 100 and ECUs 102 and 104.

Figure 2:
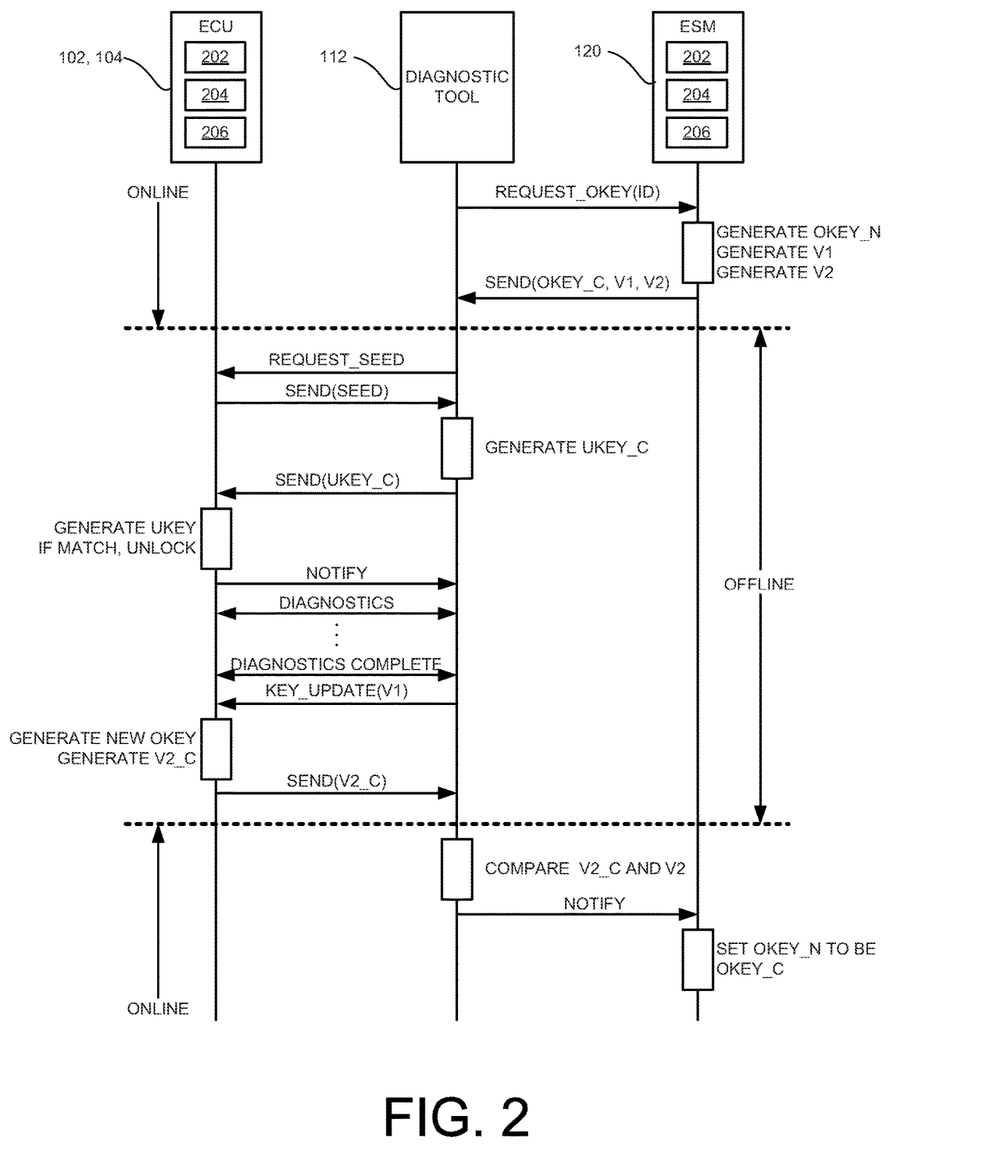
FIG. 2 depicts a diagram illustrating accessing the secured electronic control units of FIG. 1 when a diagnostic tool is in a semi-offline environment.

FIG. 2 depicts a diagram illustrating accessing the ECUs 102 and 104 of FIG. 1 when a diagnostic tool 112 is in a semi-offline environment. In the illustrated example, the ESM 120 and the ECU(s) 102 and 104 share a common security key (SKEY) 202 and a common counter value (C) 204. In some examples, the ECU(s) 102 and 104 in the vehicle 100 do not share a common SKEY or a common counter value. In such examples, the diagnostic tool 112 requests access to the ECU(s) 102 and 104 on an individual basis. The security key (SKEY) and the counter value (C) are assigned during, for example, the manufacture of the vehicle 100. When the diagnostic tool 112 is online and a vehicle 100 is to be diagnosed, the diagnostic tool 112 requests the authentication data 122 from the ESM 120 based on the vehicle identifier of the vehicle 100. In response to the request, the ESM 120 generates a new offline key (OKEY_N), a first verifier (V1), and a second verifier (V2) based on a security key (SKEY) 202 and a counter value (C) 204 stored by the ESM 120. The first verifier (V1), and the second verifier (V2) are generated in accordance with Equation (1) below.

$$V1 = \text{encrypt}(PKEY, OKEY\_N \| C)$$

$$V2 = \text{encrypt}(OKEY\_N, C) \quad \text{Equation (1)}$$

In Equation (1) above, the first verifier (V1) and the second verifier (V2) are encrypted with a symmetrical encryption algorithm. In some examples, the first verifier (V1) and the second verifier (V2) are encrypted with an Advanced Encryption Standard (AES) algorithm, such as AES-128, AES-256, etc. The first verifier (V1) is the new offline key (OKEY_N) and the counter value (C) 204 encrypted with the security key (SKEY) 202. The second verifier (V2) is the counter value (C) 204 encrypted by the new offline key (OKEY_N). The ESM 120 returns a current offline key (OKEY_C) 206, the first verifier (V1) and the second verifier (V2) in the authentication data 122.

When the diagnostic tool 112 is to perform a diagnostic routine on one or more of the ECUs 102 and 104 of the vehicle 100, the diagnostic tool 112 requests the seed values 124 from the ECU(s) 102 and 104. The ECU 102 and 104 generate, via the processor 114 or the cryptoprocessor 116, the seed value 124 and sends the seed value 124 to the diagnostic tool 112. The diagnostic tool 112 generates a candidate unlock key (UKEY_C) in accordance with Equation (2) below.

$$UKEY\_C = \text{encrypt}(OKEY\_C, SEED) \quad \text{Equation (2)}$$

In Equation (2) above SEED is the seed value 124. The candidate unlock key (UKEY_C) is the result of encrypting the seed value 124 with the current offline key (OKEY_C) 206. The diagnostic tool 112 sends the generated candidate unlock key (UKEY_C) to the ECU(s) 102 and 104. Other functions may be used in place of encrypt in Equation (2) to generate the candidate unlock key (UKEY_C) based on the current offline key (OKEY_C) 206 and the seed value 124 and may be identified by any name.

The ECU(s) 102 and 104 generate(s) the unlock key (UKEY) in accordance with Equation (2) above based on the seed value 124 and the current offline key (OKEY_C) 206 stored in memory (e.g., the secure portion of the memory 118). The ECU(s) 102 and 104 compare(s) the candidate unlock key (UKEY_C) provided by the diagnostic tool 112 to the generated unlock key (UKEY). If the generated unlock key (UKEY) matches the candidate unlock key (UKEY_C) provided by the diagnostic tool 112, the ECU(s) 102 and 104 unlock the diagnostic mode. The ECU(s) 102 and 104 then notify the diagnostic tool 112 that the ECU(s) 102 and 104 have been unlocked. The diagnostic tool 112 and the ECU(s) 102 and 104 exchange diagnostic messages 128 and diagnostic data 130.

When the diagnostics are complete, the diagnostic tool 112 sends the first verifier (V1) to the ECU(s) 102 and 104. In response to receiving the first verifier (V1), the ECU(s) 102 and 104 recover the new offline key (OKEY_N) and the counter value (C) 204 in accordance with Equation (3) below.

$$[OKEY\_N, C] = \text{decrypt}(PKEY, V1) \quad \text{Equation (3)}$$

In Equation (3) above, the ECU(s) 102 and 104 decrypt the first verifier (V1) with the security key (SKEY) to recover the new offline key (OKEY_N) and the counter value (C) 204. This sets the new offline key (OKEY_N) to be the current offline key (OKEY_C) 206 stored in memory. The ECU(s) 102 and 104 generate a candidate second verifier (V2_C) in accordance with Equation (4) below.

$$V2\_C = \text{encrypt}(OKEY\_N, C) \quad \text{Equation (4)}$$

In Equation 4 above, the ECU(s) 102 and 104 encrypt the counter value (C) 204 with the new offline key (OKEY_N) to generate the candidate second verifier (V2_C). The ECU(s) 102 and 104 send(s) the candidate second verifier (V2_C) to the diagnostic tool 112.

The diagnostic tool 112 compares the candidate second verifier (V2_C) received from the ECU(s) 102 and 104 with the second verifier (V2) received from the ESM 120. When the candidate second verifier (V2_C) and the second verifier (V2) match and the diagnostic tool 112 is in the online mode, the diagnostic tool 112 sends the completion data 132 with the candidate second verifier (V2_C) to the ESM 120. After verifying that the candidate second verifier (V2_C) and the second verifier (V2) match, the ESM 120 sets the new offline key (OKEY_N) to be the current offline key (OKEY_C) 206. In such a manner, the ESM 120 verifies that the ECU(s) 102 and 104 have updated the offline key before switching offline keys.

In some examples, for various reasons, the diagnostic tool 112 may not send the completion data 132 after returning to the online mode. In some such example, the diagnostic tool 112 is (a) disabled from communicating with another vehicle 100 until the completion data is sent and/or (b) prevented from receiving more authentication data 122 by the ESM 120. In some examples, the diagnostic tool 112 sends the first verifier (V1) to the ECU(s) 102 and 104 (a) while the diagnostic tool 112 is in the online mode before sending the seed request, or (b) with the seed request. In some such examples, the ECU(s) 102 and 104 generate(s) and switch(es) to the new offline key (OKEY_N) (a) after a certain number of vehicle key cycles, (b) after a certain period of time, or (c) after verifying the same candidate unlock key (UKEY_C) a threshold number of times. In some examples, the ESM 120 switches to the new offline key (OKEY_N) after a period of time (e.g., six hours, twelve hours, etc.) after receiving the request for the authentication data from the diagnostic tool 112.

Figure 3A:
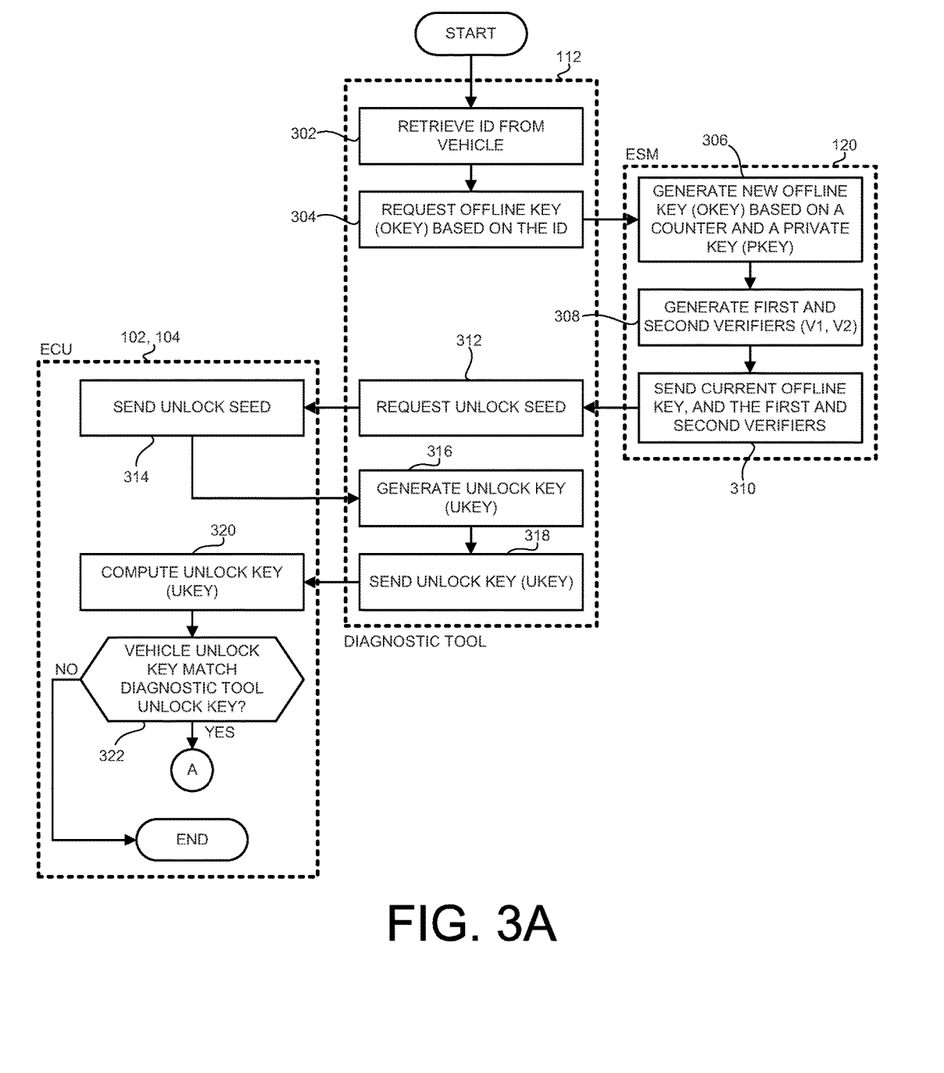
FIGS. 3A and 3B are flowcharts of a method to access the secured electronic control units of FIG. 1 when a diagnostic tool is in a semi-offline environment.

In some examples, the ESM 120, ECU(s) 102 and 104, and diagnostic tool 112 architectures can be such that OKEY_N keys are generated by ECU(s) 102 and 104 and not by the ESM 120. In such examples, during the first online phase, the diagnostic tool 112 requests an encrypted version of OKEY_N. In response to this request, the ECU(s) 102 and 104 generate OKEY_N, encrypt OKEY_N according to Equation (5) below, and send OKEY_N_E to the diagnostic tool 112, which then transmits OKEY_N_E to the ESM 120 (e.g., during block 304 of FIG. 3A below).

$$OKEY\_N\_E = encrypt(PKEY, OKEY\_N) \qquad \text{Equation (5)}$$

Upon receipt of the request, instead of generating a new offline key, the ESM 120 decrypts OKEY_N_E in accordance with Equation (6) below.

$$OKEY\_N = decrypt(PKEY, OKEY\_N\_E) \qquad \text{Equation (6)}$$

OKEY_N is then transmitted to the diagnostic tool 112 for use in block 316. In this example, the ECU(s) 102 and 104 invalidate OKEY_N after certain threshold criteria are met (as discussed above). In this example, the ESM 120 neither stores nor generates OKEY_N.

Figure 3B:
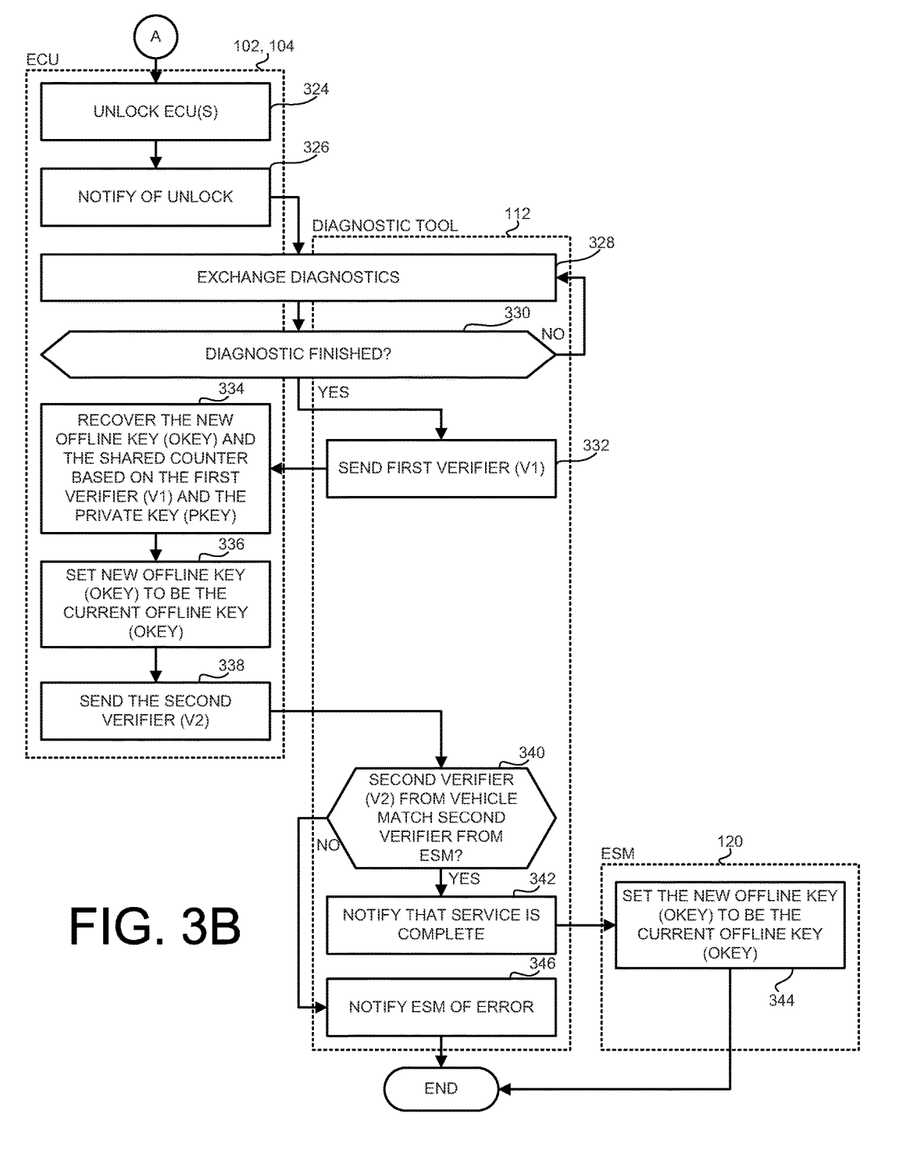

FIGS. 3A and 3B are flowcharts of a method to access the secured ECUs 102 and 104 of FIG. 1 when a diagnostic tool 112 is in a semi-offline environment. Initially, at block 302 (FIG. 3A), the diagnostic tool 112 retrieves or otherwise receives an identifier (ID). The identifier is the vehicle identifier of the vehicle 100 to be diagnosed and/or the ECU identifier of the ECU 102 and 104 to be diagnosed. At block 304, the diagnostic tool 112 requests the current offline key (OKEY_C) from the ESM 120. At block 306, the ESM 120 generates the new offline key (OKEY_N) based on the counter value (C) 204 and the security key (SKEY) 202. At block 308, the ESM 120 generates the first and second verifiers (V1, V2) based on the security key (SKEY) 202, the counter (C) 204 and/or the new offline key (OKEY_N). At block 310, the ESM 120 sends the authentication data 122 which includes the first and second verifiers (V1, V2) and the current offline key (OKEY_C).

At block 312, in response to receiving the authentication data 122, the diagnostic tool 112 requests the seed value 124 from the ECU(s) 102 and 104. At block 314, the ECU(s) 102 and 104 send the seed value 124 to the diagnostic tool 112. At block 316, the diagnostic tool 112 generates the candidate unlock key (UKEY_C) based on the seed value and the current offline key (OKEY_C). At block 318, the diagnostic tool 112 sends the candidate unlock key (UKEY_C) to the ECU(s) 102 and 104. At block 320, the ECU(s) 102 and 104 compute the unlock key (UKEY) based on the current offline key (OKEY_C) stored in memory and the seed value. At block 322, the ECU(s) 102 and 104 determine whether the candidate unlock key (UKEY_C) sent by the diagnostic tool 112 at block 318 matches the unlock key (UKEY) computed at block 322. In response to the candidate unlock key (UKEY_C) matching the unlock key (UKEY), the method continues at block 324 (FIG. 3B). Otherwise, in response to the candidate unlock key (UKEY_C) not matching the unlock key (UKEY), the method ends.

At block 324, the ECU(s) 102 and 104 unlock their diagnostic modes. At block 326, the ECU(s) 102 and 104 notify the diagnostic tool. At blocks 328 and 330, the ECU(s) 102 and 104 and the diagnostic tool 112 exchange diagnostic commands 128 and diagnostic data 130 until the diagnostic procedure is complete. At block 332, the diagnostic tool 112 sends the first verifier (V1) to the ECU(s) 102 and 104. At block 334, the ECU(s) 102 and 104 recover the new offline key (OKEY_N) and the counter value (C) based on the first verifier (V1) and the security key (SKEY). At block 336, the ECU(s) 102 and 104 set the new offline key (OKEY_N) to be the current offline key (OKEY_C). At block 338, the ECU(s) 102 and 104 generate the second verifier (V2) based on the counter value (c) and the new offline key (OKEY_N) and sends the second verifier (V2) to the diagnostic tool 112.

At block 340, the diagnostic tool 112 compares the second verifier (V2) received from the ECU(s) 102 and 104 to the second verifier (V2) received from the ESM 120. In response to the second verifier (V2) received from the ECU(s) 102 and 104 matching the second verifier (V2) received from the ESM 120, the method continues at block 342. Otherwise, in response to the second verifier (V2) received from the ECU(s) 102 and 104 not matching the second verifier (V2) received from the ESM 120, the method continues at block 346. At block 342, the diagnostic tool 112 notifies the ESM 120 that the diagnostic service is complete. At block 344, the ESM 120 sets the new offline key (OKEY_N) to be the current offline key (OKEY_C). At block 346, the diagnostic tool 112 notifies the ESM 120 of the error.

The flowchart of FIGS. 3A and 3B are representative of machine readable instructions stored in memory (such as the memory 118 and 136 of FIG. 1) that comprise programs that, when executed by a processor (such as the processors 114, 116, and 134 of FIG. a), implement the example ECU(s) 102 and 104, the example diagnostic tool 112, and the example ESM 120 of FIGS. 1 and 2. Further, although the example program(s) is/are described with reference to the flowcharts illustrated in FIGS. 3A and 3B, many other methods of implementing the example ECU(s) 102 and 104, the example diagnostic tool 112, and the example ESM 120 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle electronic control unit comprising:
   a first processor to, when unlocked, provide diagnostic information; and
   a second processor to:
      send a seed value to a diagnostic tool;
      in response to receiving a correct unlock key based on the seed value, unlock the first processor;
      after receiving a first verifier from the diagnostic tool, decrypt the first verifier to generate a new key;
      replace a current key with the new key;
      send a second verifier to the diagnostic tool;
      wherein the first verifier, when decrypted, includes the new key and a counter value, and wherein the second processor is to encrypt the counter value with the new key to generate the second verifier
   wherein the unlock key received by the secure processor is generated by the diagnostic tool based on the random seed received from the secure processor and the initial offline key received from a remote security manager.

2. The vehicle electronic control unit of claim 1, including a secure portion of memory to store a security key shared with a remote security manager, and wherein decrypting the first verifier includes decrypting the first verifier with the security key.

3. The vehicle electronic control unit of claim 1, wherein the second processor is a cryptoprocessor.

4. The vehicle electronic control unit of claim 1, including a secure portion of memory, the secure portion of the memory storing the current key and a security key shared with a remote security manager.

5. A method for an electronic control unit to provide diagnostic information comprising:
   sending, by a secure processor, a random seed to a diagnostic tool;
   in response to receiving an unlock key, by the secure processor, unlocking a diagnostic processor;
   exchanging, by the diagnostic processor, the diagnostic information with the diagnostic tool;
   after receiving a first verifier from the diagnostic tool, decrypting, by the secure processor, the first verifier to generate an new offline key;
   replacing, by the secure processor, an initial offline key with the new offline key; and
   sending, by the secure processor, a second verifier to the diagnostic tool;
      wherein the first verifier, when decrypted, includes the new key and a counter value, and wherein the second processor is to encrypt the counter value with the new key to generate the second verifier
   wherein the unlock key received by the secure processor is generated by the diagnostic tool based on the random seed received from the secure processor and the initial offline key received from a remote security manager.

6. The method of claim 5, including storing, in a secure portion of memory, a security key shared with a remote security manager, and wherein decrypting the first verifier includes decrypting the first verifier with the security key.

7. The method of claim 5, wherein the first verifier, when decrypted, includes the new offline key and a counter value.

8. The method of claim 7, including encrypting, by the secure processor, the counter value with the new offline key to generate the second verifier.

9. The method of claim 5, including storing, in a secure portion of memory, the initial offline key and a security key shared with a remote security manager.

10. The vehicle electronic control unit of claim 1, wherein the second processor is configured to communicate with the diagnostic tool when the diagnostic tool is in an offline mode during which the diagnostic tool is unable to communicate with a remote security manager.

11. The method of claim 5, wherein the diagnostic information is exchanged by the secure processor with the diagnostic tool upon the secure processor sending a success notification to the diagnostic tool.

12. The method of claim 5, further including receiving, by the secure processor, the first verifier from the diagnostic tool after exchanging the diagnostic information.

13. The method of claim 5, further including receiving, by the secure processor, the first verifier with the unlock key from the diagnostic tool.

14. The method of claim 5, wherein the second verifier is sent, by the secure processor, to the diagnostic tool for comparison with a reference second verifier received from a remote security manager and subsequent determination as to whether the remote security manager is to replace the initial offline key with the new offline key.

15. The method of claim 5, wherein the secure processor communicates with the diagnostic tool in an offline mode of the diagnostic tool during which the diagnostic tool is unable to communicate with a remote security manager.

* * * * *